F. R. HUDSON.
ACETYLENE GAS GENERATOR.
APPLICATION FILED JAN. 31, 1911.
1,021,462.
Patented Mar. 26, 1912.
4 SHEETS—SHEET 1.
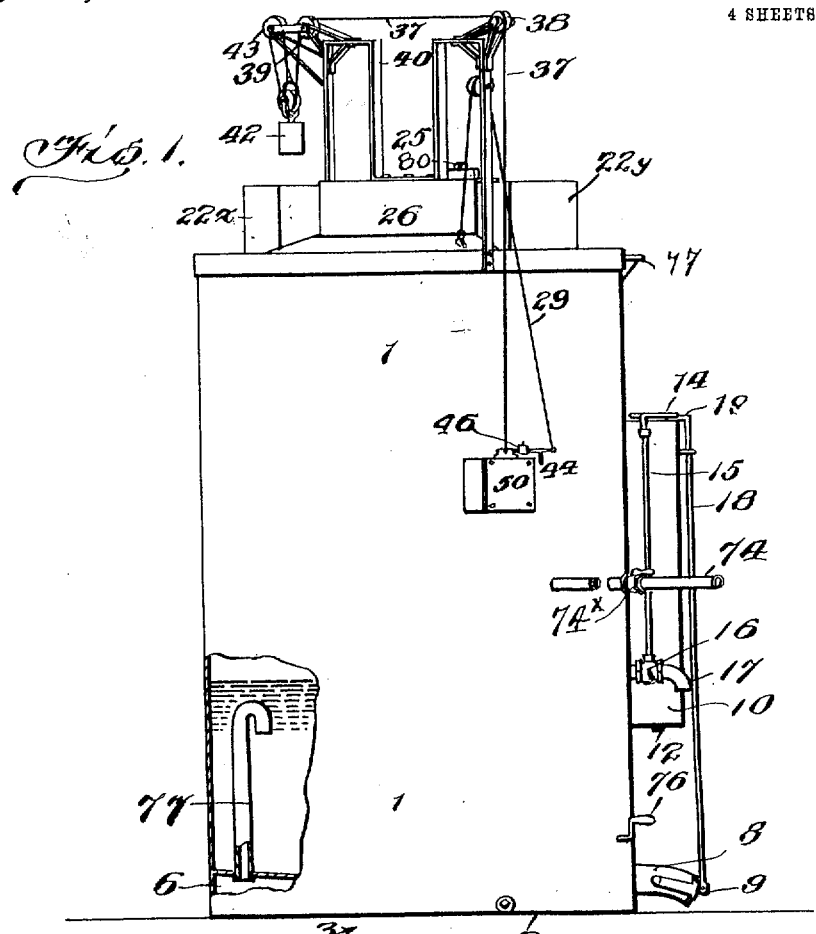
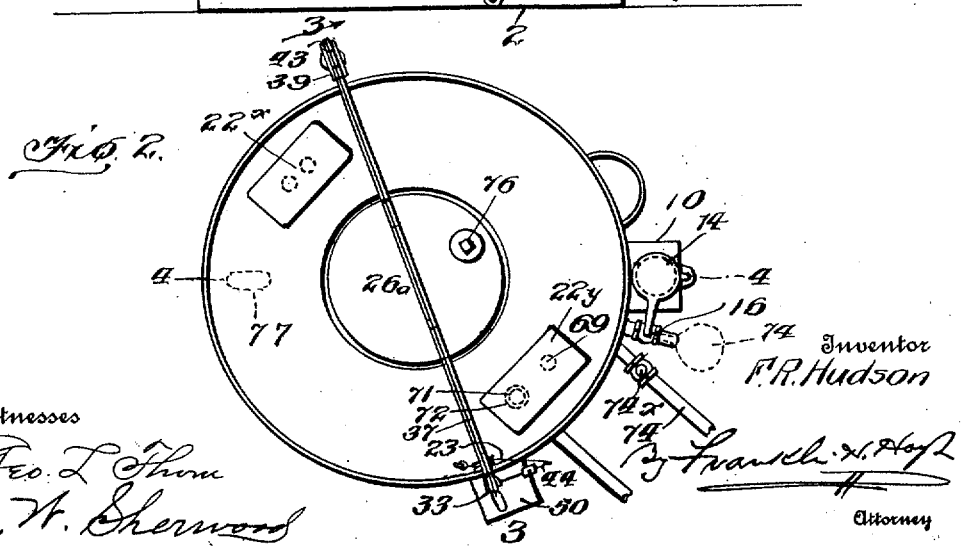

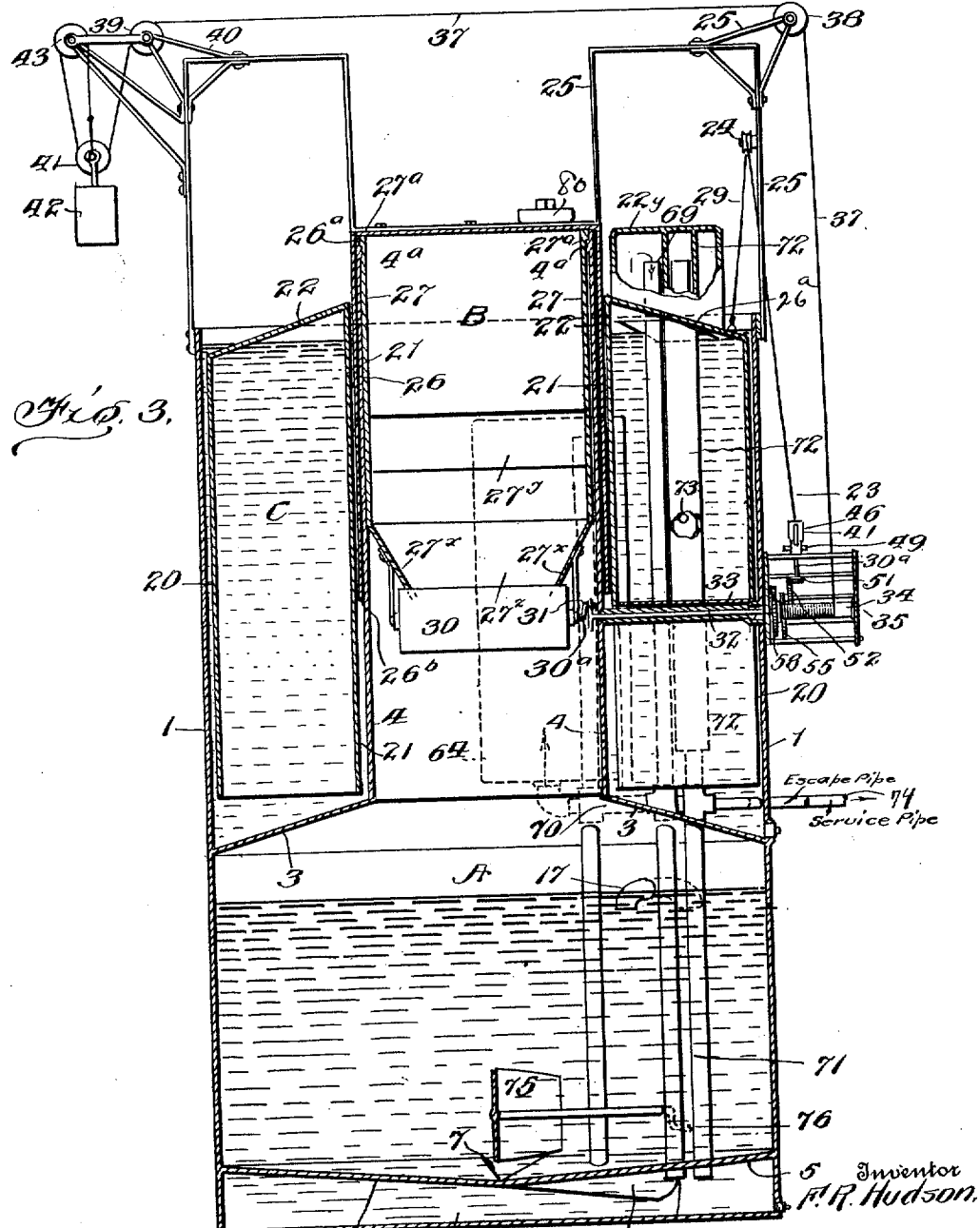

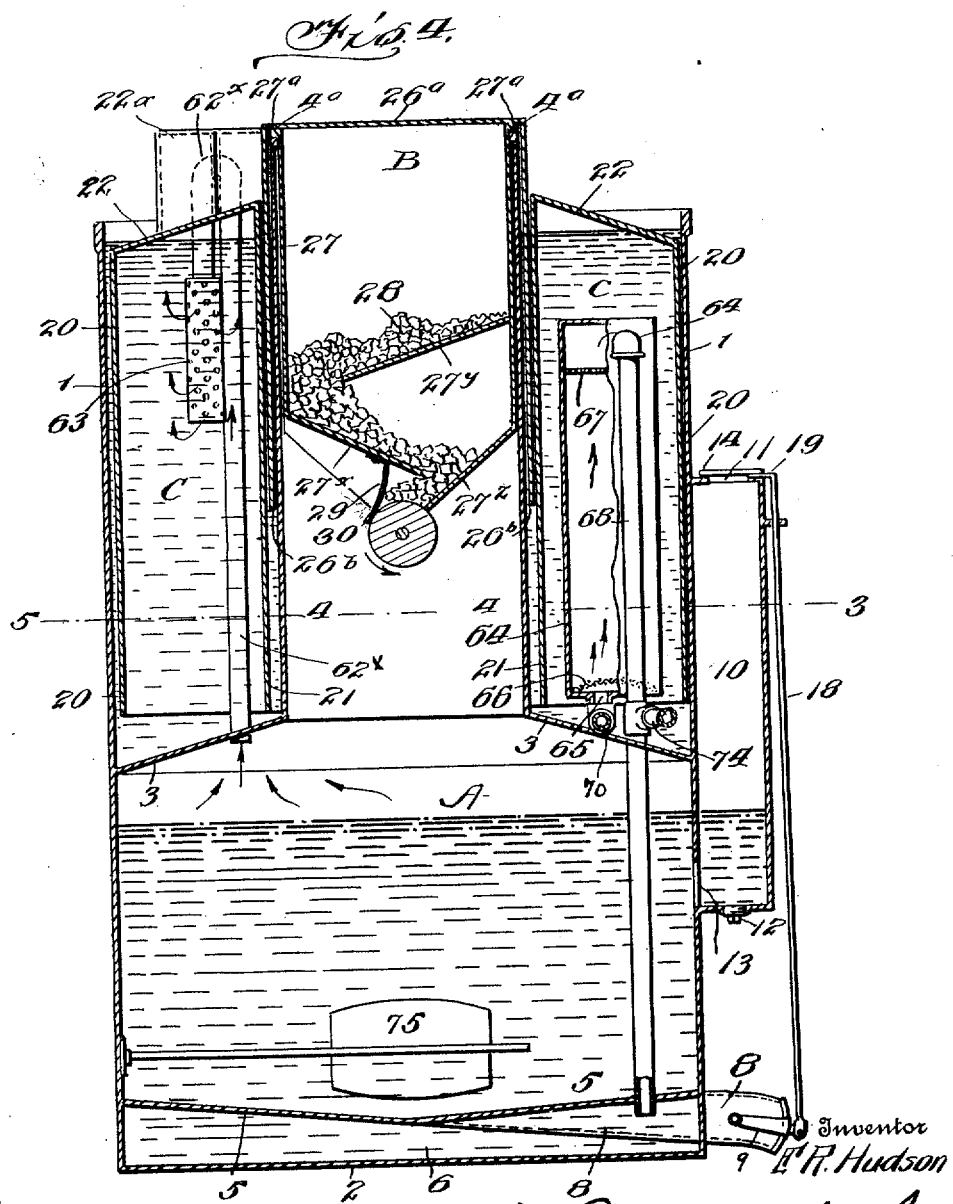

F. R. HUDSON.
ACETYLENE GAS GENERATOR.
APPLICATION FILED JAN. 31, 1911.
1,021,462.
Patented Mar. 26, 1912.
4 SHEETS—SHEET 4.
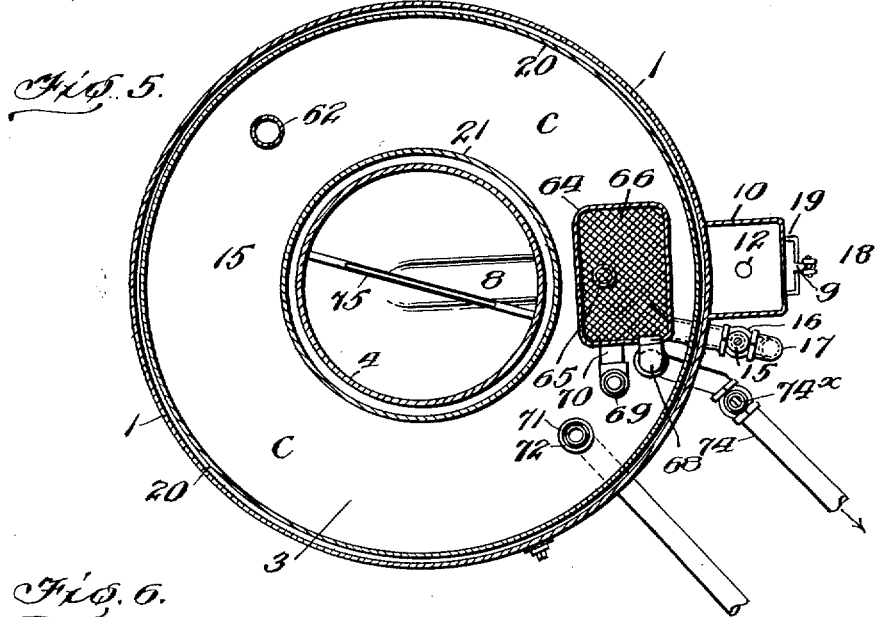
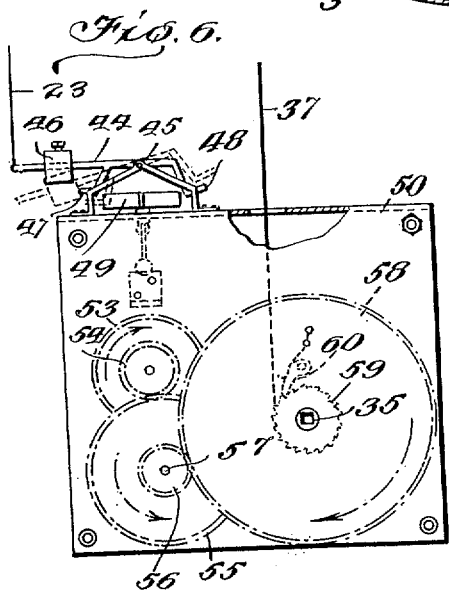
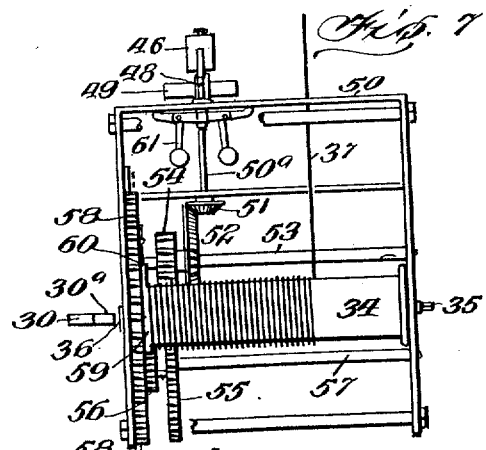
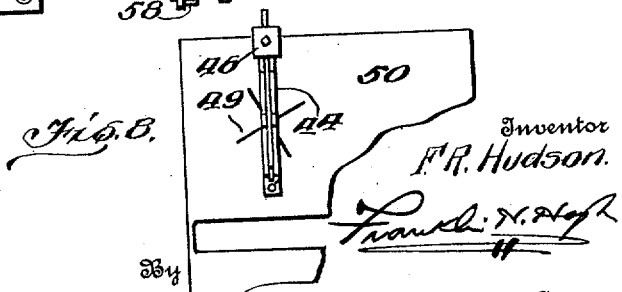
Witnesses
Geo. L. Thom
J. W. Sherwood
Inventor
F. R. Hudson.
By Frank N. Hoyt
Attorney
COLUMBIA PLANOGRAPH CO., WASHINGTON, D. C.

UNITED STATES PATENT OFFICE.

FRANK R. HUDSON, OF WINDSOR, MISSOURI.

ACETYLENE-GAS GENERATOR.

1,021,462.  Specification of Letters Patent.  Patented Mar. 26, 1912.

Application filed January 31, 1911. Serial No. 605,710.

*To all whom it may concern:*

Be it known that I, FRANK R. HUDSON, a citizen of the United States, residing at Windsor, in the county of Henry and State of Missouri, have invented certain new and useful Improvements in Acetylene-Gas Generators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in acetylene gas generator, and it consists in the combinations, constructions and arrangements herein described and claimed.

An object of my invention is to provide a gas generator, which shall be automatic in its operation, *i. e.*, the generation of gas is in proportion to the amount of gas used.

A further object of my invention is to provide a novel form of mechanism for accomplishing the above named result.

A further object of my invention is to provide a novel means for positively feeding the carbid from which the gas is generated, when it is needed, and for stopping the feed when it is not needed.

A further object of my invention is to provide a device having a filling chamber connected with the generation chamber so arranged that the generation chamber cannot be filled without opening a valve in an overflow pipe.

Other objects and advantages will appear in the following specification and the novel features of the device will be particularly pointed out in the appended claims.

My invention is illustrated in the accompanying drawings forming part of this application in which similar reference characters indicate like parts in the several views, and in which:—

Figure 1 is a side elevation of my improved generator, a portion of the figure being shown in section for the sake of clearness, Fig. 2 is a plan view of the device as shown in Fig. 1, Fig. 3 is a central section through the device on the line 3—3 of Fig. 2, Fig. 4 is a central section along the line 4—4 of Fig. 2, Fig. 5 is a horizontal section along the line 5—5 of Fig. 4, Fig. 6 is a side view showing the motor control mechanism, Fig. 7 is an end view showing the motor control mechanism, and Fig. 8 is a plan view of a portion of the motor control mechanism.

In carrying out my invention, I provide a main cylindrical casing consisting of the sides 1 and the bottom 2. This casing is open at the top. Within the walls 1 is an annular partition 3, which slopes upwardly toward the center and joins the walls of an inner cylinder 4, as clearly shown in Figs. 3 and 4. Within the cylinder 1 near the bottom thereof is an inverted conical false bottom 5, beneath which is a water chamber 6 whose purpose will be hereinafter explained. Above the false bottom is the opening 7 (see Fig. 3) of a pipe 8, which extends downwardly and is provided with a sludge cock 9.

On one side of the cylinder 1 is a chamber 10, provided with an opening 11 at its top and with a plug 12 at its bottom. This chamber communicates with the interior of the cylinder 1, by means of the opening 13. The opening 11 has a cover 14, which is secured to a rod 15, extending downwardly, and connected to a valve 16 in an overflow pipe 17 (see Fig. 1). This cover 14 must be swung aside to the position shown in dotted lines in Fig. 2 in order to fill the chamber 10, and when it is swung aside the overflow cock 16 is opened. From an inspection of Fig. 4, it will be seen that the sludge cock 9 is connected to a rod 18, which has a lateral extension 19 at its upper end that lies underneath the cover 14 when the latter is in its normal or closed position. It is, therefore, apparent that when the sludge cock is open, the cover 14 must be swung aside, and, hence, the valve 16 in the pipe 17 must also be opened to admit air to refill the space previously occupied by the water and which has been drawn off.

Referring again to Figs. 3 and 4, it will be seen that between the cylinders 4 and 1 is an annular cylindrical receptacle consisting of the outer walls 20 and the inner walls 21. The inner and outer cylinders are joined by a top 22, and the construction described provides a receptacle for the gas, as will be hereinafter described.

Referring to Fig. 3, it will be seen that to the top 22 is attached a cord 23, which passes over a pulley 24 on a frame 25, which is carried partly by the main cylinder 1, and is secured on the top 26ᵃ of a cylinder 26.

The cord 23 runs down to a control device of the motor. This control device will be taken up later. This cylinder 26, as will be seen from Figs. 3 and 4, fits over the top of the inner cylinder 4, and extends downwardly, being open at its bottom $26^b$.

In Fig. 4, I have shown the receptacle for the carbid. This consists of a cylinder 27, which is concentric with the cylinder 4, and which is suspended therefrom by a flange $4^a$ on the cylinder 4, which is engaged by a shoulder $27^a$ at the top of the cylinder 27. The cylinder 27 is provided with an inclined bottom $27^x$. It is also provided with inclined partitions $27^y$ and $27^z$ (see Fig. 4), for the support of the carbid 28. As will be seen from the figure, the partition $27^y$ terminates short of the wall of the cylinder on one side, and the partition $27^z$ terminates short of the bottom $27^x$. This provides an opening through which the carbid passes. The carbid is kept from feeding by means of a resilient member 29 secured to the partition $27^z$ and by a feed cylinder 30. When the latter is turned in the direction indicated by the arrow in Fig. 4, the carbid is fed past the resilient member 29 by a frictional engagement of the carbid with the cylinder, and it is not fed unless the cylinder is rotated. The means for rotating the cylinder constitutes one of the main features of my invention.

In Fig. 3 the cylinder 30 is shown as suspended from the bottom $27^x$. The axis of the cylinder is prolonged into a crank member $30^a$, which is pivotally connected with an arm 31 on a shaft 32 carried in a tube or bearing 33, which runs through the walls of the outer cylinder 1 and the inner cylinder 4. The outer end of this shaft is arranged to be connected with a motor, as shown in Fig. 7.

Referring now to Figs. 6 and 7, it will be seen that I have provided a drum 34 whose shaft 35 is recessed at 36 to receive the squared end $30^a$ of the shaft 32. When the shaft is so connected, it is arranged to be rotated by the drum. In Fig. 3, the means for operating this drum is shown. Around the drum is wound a cord or other flexible connection 37. This cord passes over a pulley 38 on the frame 25, thence to a similar pulley 39 on the frame 40, which is similar to the frame 25, thence downwardly to the pulley 41 to which a weight 42 is suspended, thence upwardly over the pulley 43 and thence downwardly. It will be seen that as the weight 42 descends the drum 34 will be rotated.

The means for controlling the rotation of the drum 34 is shown in Figs. 6 and 7. Referring particularly to Fig. 6, it will be seen that the cord 23 is secured to the end of a lever 44, which is pivoted at 45, and which bears an adjustable weight 46 on one end.

The lever 44 is provided on the same side of its pivot with the weight with a bent arm 47, and on the opposite side of the pivot 45 with a similar arm 48. These arms are arranged to project into the path of a rotatable wheel provided with blades 49. The shaft $50^a$ is mounted in the casing 50 of the motor, and is provided on its lower end with a gear 51 arranged to mesh with a gear 52 on a shaft 53, which is journaled in the sides of the casing (see Fig. 7). The connection between the drum 34 and the gear 52 is through the medium of the gear 54 on shaft 53, gears 55 and 56 on shaft 57, and with gear wheel 58 on the shaft 35. The shaft 35 also bears a ratchet 59 (see Fig. 6) which is controlled by a spring-actuated pawl 60. The shaft $50^a$ is provided with a governor 61 for preventing the too rapid turning thereof.

It will be apparent that if the drum is free to turn, the weight 42 will cause it to revolve and that the turning of the drum through the medium of the gears described will cause the rotation of the shaft $50^a$ and of the vanes or blades 49. If now, the cord or cable 23 is slacked up, then the lever 44 will take the dotted line position shown in Fig. 6 when the arm 47 will engage the vane 49, thereby stopping the rotation of the drum. In the full line position in Fig. 6, the arms of the lever 44 are both out of the way of the vanes 49 and the drum 34 may be rotated. If tension is exerted on the cord 23, the opposite end of the lever 44 will be thrown downwardly and the arm 48 will engage the vanes, thereby stopping the rotation of the drum.

In Fig. 4, I have shown a pipe 62 whose lower end projects into the bottom of the main cylinder 1, and is thence carried upwardly, being bent back upon itself at $62^x$ (see Fig. 4) and terminating in a perforated washer 63. In order to accommodate the upper portion of the pipe 62 there is an extension $22^x$ of the top 22.

Referring now to Fig. 4, I have shown therein a gas purifier which consists of a closed cylinder 64. This cylinder is provided at its bottom with an inlet 65, and has just above the inlet a screen 66. Near the top of the cylinder is another screen 67. Extending from the space between the screen 67 and the top of the cylinder 64 is a pipe 68 which passes through the bottom of the cylinder 64 and downward through the top 3 of the main cylinder 1, and through the false bottom 5, terminating in the chamber 6.

In Fig. 3 is seen an extension $22^y$ of the top 22. This extension is provided with a pipe 69 whose upper open end is normally disposed in the extension $22^y$ when the latter is in its lower position, and which pipe 69 extends downwardly and connects with a pipe 70 (see Fig. 3) that communicates with the bottom of the purifier 64. The pipe 69 is continued down through the false bottom and terminates in the water seal chamber 6, as shown in Fig. 3. A pipe 71 extends from the water chamber 6 (see Fig. 3) upwardly into a larger pipe 72 whose upper end is secured to the top of the extension $22^y$, and whose lower end terminates above the lower end of the annular gas chamber formed by the walls 20 and 21. This pipe 72 has an opening 73. The pipe 68 leading from the purifier is connected with a service pipe 74.

In the bottom of the generating tank is an agitator 75, which is provided with a handle 76 by which it may be manipulated. A pipe 77 (see Fig. 1) is provided for the purpose of filling the water seal chamber 6 at the bottom.

From the foregoing description of the various parts of the device the operation thereof may be readily understood.

The carbid is introduced through an opening regulated by means of a removable cap 80 (see Fig. 3), while the air is introduced in the chamber 10 by swinging the cover 14 in the manner already described. This water fills the lower part of the generation chamber A and also the water seal chamber 6 at the bottom. The weight 42 causes the revolution of the drum 34 and the consequent feeding of the carbid from the hopper B into the water in the generation chamber A the gas is now produced and passes upwardly through the pipe 62, washer 63, into the space within the annular receptacle C. The annular receptacle C now rises. When the receptacle or gasometer C rises to a predetermined height, the slackening of the cable 23 will cause the motor control device to stop the motor in the manner already explained. This will, of course, stop the feeding of the carbid. The gas contained in the gasometer or receptacle C now passes into the extension $22^y$, as shown in Fig. 3, following the course of the air down the pipe 69 and passes, by means of the pipe 70, into the bottom of the purifier 64, thence upwardly past the screens 66 and 67 (see Fig. 4), thence downwardly through the pipe 68 to the service pipe 74. The latter is controlled by a stop cock $74^x$ (see Fig. 5). Now as the gas is used out of the mains (not shown) connected with the service pipe 74, the floating gasometer C gradually lowers, and when the cable 23 is again drawn taut it operates the motor control device, so that the motor again starts up and positively feeds the carbid. If the carbid should collect at the bottom of the generator A in such a manner that the water cannot get to it, then the agitator 75 is manipulated. If the hopper B should be empty and all the gas should be used, then the gasometer C will descend, so as to cause the control device to stop the motor. It will be apparent that the control device may be set so that it will feed carbid to replace any gas used, and will stop feeding the carbid as soon as that loss is made up, but if it has no more carbid then, as stated, the control device will stop the motor when the gasometer C has descended to its lowest position.

As has been before stated, the cover 14 must be swung to one side when the generation tank A is to be filled with water. The turning of the cover 14 to one side operates the cock 16 in the overflow pipe 17 (see Figs. 1 and 3) so that the water cannot rise above this pipe 17. The opening of the cock 16, when the cover 14 is turned, will also allow air to fill the generation chamber when the water is drawn off through the sludge cock, which cannot be opened unless the cover 14 is turned to one side as already explained.

What I claim to be new is:—

An apparatus for generating acetylene gas, comprising a casing having a carbid chamber, a friction feed cylinder mounted within the exit end of said chamber, a water tank about the carbid chamber, a gas receptacle telescoping within said tank, a tube passing through the walls of the carbid chamber and tank, a rotatable shaft mounted in said tube, an arm fitted to said shaft, a crank secured to the cylinder and pivoted to said disk, a reel fixed to said shaft, bars fastened to the casing, bracket members mounted upon said bars, pulleys journaled upon said members, a cable passing about the pulleys, a weight, a pulley fastened thereto, and about which the cable passes, gear mechanism connected to said reel, a winged wheel operating therewith and designed to regulate the rotary movement of the reel, a cord fastened to the telescoping gas receptacle, a weighted lever pivotally mounted adjacent to the governor, and adapted to engage said winged wheel, and to which lever said cord is connected, as set forth.

In testimony whereof I hereunto affix my signature in the presence of two witnesses.

FRANK R. HUDSON.

Witnesses:
JAMES W. PARKER,
R. E. BALL.